United States Patent Office 3,476,665
Patented Nov. 4, 1969

3,476,665
PREPARATION OF 7-AMINO-4-THIA-OENANTHIC ACID
Johannes H. Ottenheym, Sittard, Jozef A. Thoma, Vaals, and Johannes H. C. M. A. Gregoire, Beek, Netherlands, assignors to Stamicarbon N.V., Heerlen, Netherlands
No Drawing. Filed June 8, 1966, Ser. No. 555,952
Claims priority, application Netherlands, June 9, 1965, 6507297
Int. Cl. B01j 1/10
U.S. Cl. 204—158        6 Claims

ABSTRACT OF THE DISCLOSURE

There is provided a process for the preparation of 7-amino-4-thia-oenanthic acid in which, under the influence of ultraviolet irradiation, beta-mercaptopropionic acid is reacted with an allyl amine in the presence of a solvent. In place of the acid, the nitrile or an ester or salt may be used. Compounds such as 7-amino-4-thia-oenanthic acid and nitrile are produced, the amino acid being useful as an antioxidant and the nitrile being useful as a surface active agent.

---

The present invention relates to the preparation of a novel compound, 7-amino-4-thia-oenanthic acid and a novel process for making such compound. The new compound possesses generally the chemical properties of an amino acid and can be used as such in various chemical processes. The new amino-acid is useful as an antioxidant and its derivatives, for example the nitrile and the alkaline metal salts are useful as surface active agents.

According to this invention, a process for the preparation of 7-amino-4-thia-oenanthic acid is provided in which, under the influence of ultraviolet irradiation, beta-mercaptopropionic acid is reacted with an allyl amine, in the presence of a solvent. The allyl amine is either used in the form of an acid salt, or in the presence of an acid, so that the electrons of the nitrogen atom are bound. Instead of beta-mercaptopropionic acid, the 7-amino-4-thia-oenanthic acid product can then be recovered from the resulting reaction mixture, either directly, or, if use is made of the corresponding nitrile or an ester or salt, after the resulting nitrile or ester or salt of the 7-amino-4-thia-oenanthic acid has been converted into the free acid. This conversion may be carried out by the methods commonly employed for such purposes.

The reaction between the starting materials does not require any special measures with regard to pressure or temperature. The reaction can thus be conducted at atmaspheric pressure and at room temperature, e.g. 10 to 30° C. If beta-mercaptopropionic acid is used as the starting material, a small amount of heat will be evolved when the said acid is brought into contact with the allyl amine, due to the exothermic salt formation.

The realization of the reaction does require irradiation with ultra-violet rays. Irradiation with sunlight will itself permit the reaction to proceed at a very low rate, but the reaction can be substantially completed in only 1 to 2 hours if use is made of the customary sources of ultra-violet radiation, e.g. mercury vapour lamps, which emit rays having a wavelength of below 3000 Angstrom units. In the absence of ultra-violet radiation, the reaction does not proceed.

In the reaction according to the invention, chemical addition of beta-mercaptopropionic acid to the allyl amine takes place. The reaction may also be started from an ester or a salt or the nitrile of beta-mercaptopropionic acid, and thus the presence of a free carboxylic acid group is not critical to the invention. The said addition is, however, substantially inhibited by the free electron pair on the nitrogen atom in the free allyl amine molecule. According to this invention, to prevent this, the said free electron pair is chemically bound up. This can be effected simply by using the allyl amine either in combination with an acid, e.g., a mineral acid such as hydrochloric acid or an organic acid such as acetic acid. Alternatively, the amine may be used in the form of its salt, e.g., allyl amine hydrohalide. On the other hand, no special measure for binding the free electron pair is required if the reaction is conducted with a slight excess, e.g., of 0.5 to 5 moles-percent, of beta-mercaptopropionic acid. In this instance, the beta-mercaptopropionic acid serves as the aforementioned organic acid to tie up the free electron pair on the nitrogen atom.

However, if use is made of the nitrile or an ester of beta-mercaptopropionic acid, an excess thereof will have little, if any, such effect. Generally equimolecular amounts of these reactants are used.

It has furthermore been found that the reaction proceeds more smoothly and yields smaller amounts of undesired by-products if it is conducted in the presence of added free hydrogen, nitrogen or other inert gas. This can be achieved simply by passing a flow of inert gas through the reaction mixture. The amount of inert gas may be varied over wide limits, for instance, as little as 0.1 is effective, but amounts above 5 moles of hydrogen per mole of allyl amine offer no advantage.

To facilitate the reaction between the starting materials, use is made of a solvent. Examples of suitable solvents include aromatic hydrocarbons, such as benzene and polar solvents, such as water and alcohols. The amount of solvent may be varied. As a rule, for optimum results, use is made of an amount by weight of solvent which is approximately equal to the amount by weight of the starting materials, so that the reaction mixture contains about 50% by weight of solvent. The amount of solvent may, however, be widely varied, e.g., from about 10% to 90%.

If the nitrile of beta-mercaptopropionic acid is used as starting material, the product of the addition reaction will be the nitrile of 7-amino-4-thia-oenanthic acid. This is itself a novel compound, and can be converted into 7-amino-4-thia-oenanthic acid in a way known in itself, usually by treating it with an acid.

The esters of beta-mercaptopropionic acid that can be suitably used as starting materials include the lower alkyl esters such as methyl, ethyl, isopropyl, butyl; cycloalkyl esters such as cyclohexyl; and monocyclic carbocyclic aryl esters such as phenyl esters of beta-mercaptopropionic acid. If an ester is used as starting material, the corresponding ester of 7-amino-4-thia-oenanthic acid, which are also novel compounds provided by this invention, is formed as the product of the addition reaction. This ester can be converted into 7-amino-4-thia-oenanthic acid by conventional techniques, e.g., by hydrolysis with the aid of an acid.

The 7-amino-4-thia-oenanthic acid can be recovered from the reaction mixture in a known way, e.g., by evaporation and crystallization. It is furthermore possible to obtain a purified product by contacting an aqueous solution of the acid with an ion exchanger.

It will be appreciated, as stated, that the practice of this invention is very simply achieved and requires little more than bringing together the indicated reactants in a suitable solvent and invalidating the same with a conventional source of ultra-violet light. Thus, the following examples are intended merely to illustrate specific modes of practice of this invention, which invention is not to be limited thereto.

EXAMPLE I

In a ½-litre reaction vessel (made of quartz) 28.5 g. of allyl amine (0.5 mole) is added to a solution of 54.5 g.

of beta-mercaptopropionic acid (0.52 mole) in 80 g. of water, the temperature being kept at 25° C. by cooling.

The mixture is then subjected to ultra-violet irradiation for two hours at 25° C.

The resulting aqueous solution is passed over a cation exchanger, which is subsequently washed with water. The eithiodipropionic acid formed as a by-product remains in solution. The 7-amino-4-thia-oenanthic acid is dissolved out of the cation exchanger by a treatment with aqueous ammonia, after which the solution is evaporated to dryness.

The yield is 72 g. of 7-amino-4-thia-oenanthic acid (content 98.5%; melting point 171° C.), which means an efficiency of 87%.

EXAMPLE II

In a ½-litre reaction vessel (made of quartz) 54.5 g. of beta-mercaptopropionic acid is added to a solution of 28.5 g. of allyl amine in 80 g. of water, the temperature being kept at 25° C. by cooling. While a hydrogen flow is passed through (rate: 5 litres per hour, measured at 0° C. and 1 at.), the reaction mixture is subjected to ultra-violet irradiation for two hours at 25° C.

The resulting colorless, aqueous solution is treated in the way indicated in Example I.

The yield is 76.5 g. of 7-amino-4-thia-oenanthic acid (content 99.2%, melting point 173° C., efficiency 93%).

EXAMPLE III

In a ½-litre reaction vessel (made of quartz) 54.5 g. of beta-mercaptopropionic acid is added to a solution of 28.5 g. of allyl amine in 150 ml. of isopropanol, the temperature being kept as 25° C. by cooling.

The reaction mixture is then subjected to ultra-violet irradiation for two hours at 25° C. The 7-amino-4-thia-oenanthic acid separates out as a solid substance.

The isopropanol is removed from the resulting reaction product by distillation, after which the 7-amino-4-thia-oenanthic acid is purified by recrystallization from 90%-by-weight ethanol.

The yield is 71.7 g. of 7-amino-4-thia-oenanthic acid (content 99.2%, melting point 173° C., efficiency 87%).

EXAMPLE IV

In a ½-litre reaction vessel (made of quartz) 21.9 g. of the nitrile of beta-mercaptopropionic acid (0.25 mole) is added to a solution of 24.3 g. of allyl amine hydrochloride (0.26 mole) in 70 ml. of ethanol. The reaction mixture is irradiated with ultra-violet rays for one hour at 25° C., after which the ethanol is removed by distillation.

Analysis of the reaction product shows that, after being treated with a 10%-by-weight aqueous sodium hydroxide solution, this product consists mainly of the nitrile of 7-amino-4-thia-oenanthic acid (boiling point at 14 mm.: 107° C.).

After the ethanol distillation, 250 ml. of concentrated hydrochloric acid is added to the reaction product, which is then hydrolyzed by boiling it for two hours with reflux cooling. The resulting product is then evaporated to dryness at reduced pressure.

Subsequently, the residue is dissolved in water and the resulting aqueous solution is treated further in the way indicated in Example I.

The yield is 35.5 g. of 7-amino-4-thia-oenanthic acid (content 98.5%, melting point 171° C., efficiency 87%).

EXAMPLE V

In a ½-litre reaction vessel (made of quartz) 24.3 g. of allyl amine hydrochloride (0.26 mole) is added to a solution of 30 g. of beta-mercaptopropionic methyl ester (0.27 mole) in 40 ml. of methanol. The reaction mixture is irradiated with ultra-violet rays for two hours at 25° C., after which the methanol is removed by distillation.

After addition of 250 ml. of concentrated hydrochloric acid, the reaction product is hydrolyzed by boiling it for two hours with reflux cooling. The resulting product is then evaporated to dryness at reduced pressure.

Subsequently, the residue is dissolved in water, and the resulting aqueous solution is treated further in the way indicated in Example I.

The yield is 33.1 g. of 7-amino-4-thia-oenanthic acid (content 99%, melting point 172° C., efficiency 80%).

It will be appreciated that the foregoing examples are merely illustrative of the manner in which this invention may be practiced. Thus, the introduction of hydrogen as employed in Example II may be used in the methods of the other examples with improvement in the yield and purity of the product. Similarly, the ester and nitrile reactions of Examples IV and V could be carried out in water, as in Examples I and II.

What is claimed is:

1. Process for the preparation of addition products of allyl amine and a mercapto-compound selected from the class consisting of beta-mercaptopropionic acid, beta-mercaptopropionitrile, a lower hydrocarbyl ester of beta-mercaptopropionic acid, the hydrocarbyl radical of which containing less than 7 carbon atoms and is selected from lower alkyl, cyclohexyl and phenyl, and an alkali metal salt of beta-mercaptopropionic acid, comprising reacting the mercapto-compounds with allyl amine, the nitrogen atom of which holds no free electrons, the reaction being carried out in a solvent medium with the aid of ultraviolet irradiation at a temperature of 10–30° C. and under atmospheric pressure, until the addition product is formed, which thus produces 7-amino-4-thia-oenathic acid from the beta-mercaptopropionic acid, 7-amino-4-thia-oenanthonitrile from the betamercaptopropionitrile, the corresponding hydrocarbyl ester of 7-amino-4-thia-oenanthic acid from the hydrocarbyl ester of beta-mercaptopropionic acid, and the corresponding alkali metal salt of 7-amino-4-thia-oenanthic aicd from the alkali metal salt of beta-mercaptopropionic acid.

2. The process of claim 1 where the said esters are selected from ethyl, isopropyl, butyl, cyclohexyl and phenyl esters.

3. The process of claim 1 wherein a lower alkyl ester of beta-mercaptopropionic acid is used.

4. The process of claim 1 wherein the nitrile of beta-mercaptopropionic acid is used.

5. The process of claim 1 herein said allyl amine is introduced as allyl amine hydrochloride.

6. The process of claim 1 wherein allyl amine is used in the presence of a required excess of about 1 to about 5 mole percent of beta-mercaptopropionic acid.

References Cited

UNITED STATES PATENTS

| | | | |
|---|---|---|---|
| 2,392,294 | 1/1946 | Rust et al. | 204—158 |
| 2,393,327 | 1/1946 | Langkammerer | 204—158 XR |
| 2,522,590 | 9/1950 | Vaughan et al. | 204—158 |
| 3,048,569 | 8/1962 | Harris | 204—158 XR |
| 3,115,515 | 12/1963 | Gaul et al. | 260—465.5 |
| 3,257,301 | 6/1966 | Louthan et al. | 204—158 |

JOSEPH P. BRUST, Primary Examiner

U.S. Cl. X.R.

260—534, 465.5, 481, 537; 252—402